United States Patent [19]

Hannukainen

[11] Patent Number: 4,658,908
[45] Date of Patent: Apr. 21, 1987

[54] ELECTRONIC CONTROL SYSTEM FOR A WORK IMPLEMENT

[75] Inventor: Hannu Hannukainen, Jyväskylä, Finland

[73] Assignee: Valmet Oy, Finland

[21] Appl. No.: 548,511

[22] Filed: Nov. 3, 1983

[30] Foreign Application Priority Data

Nov. 4, 1982 [FI] Finland .................................. 823777

[51] Int. Cl.$^4$ ........................................... A01B 63/112
[52] U.S. Cl. ........................................... 172/10; 172/7; 318/624; 318/636
[58] Field of Search ........................ 172/2, 4, 7, 9, 10; 318/587, 624, 636; 91/390, 410

[56] References Cited

U.S. PATENT DOCUMENTS

| 3,568,570 | 3/1971 | Winders | 91/390 X |
| 3,736,486 | 5/1973 | Gould et al. | 318/624 |
| 3,736,845 | 6/1973 | Weiste et al. | 91/390 |
| 4,294,162 | 10/1981 | Fowler et al. | 91/390 X |
| 4,300,638 | 11/1981 | Katayama et al. | 172/7 X |
| 4,343,365 | 8/1982 | Rajagopal et al. | 172/4 |

Primary Examiner—Richard T. Stouffer
Attorney, Agent, or Firm—Steinberg & Raskin

[57] ABSTRACT

A tractor control system has a work implement, an actuator for the work implement, an electronic circuit utilizing an analog/digital technique and including an analog/digital control unit and a device for measuring a factor dominating the performance of the actuator and providing a first signal representing the actual value of the control system, a second signal representing a set point value, and a third signal in analog form representing the difference between the values of the first and second signals. The difference constitutes the control deviation for governing the analog/digital control unit which controls the actuator. A converter converts the third signal to digital form by a sampling device for sampling at a sampling frequency $f_o$ to establish a dead range in a time dimension. The sampling device provides pulses. A comparator circuit processes the digital signal and includes comparators having limit values defining the dead range set therein. Thus, when the amplitude of the pulses established by the sampling falls outside the dead range one or more times, the sampling device provides a transition to continuous following of the control deviation, thereby performing a requisite control so that when the value of a fourth signal derived from the control deviation falls into the dead range the sampling is repeated.

9 Claims, 2 Drawing Figures

ELECTRONIC CONTROL SYSTEM FOR A WORK IMPLEMENT

BACKGROUND OF THE INVENTION

The present invention relates to a control system in a tractor. More particularly, the invention relates to a tractor control system having an electronic part carried out by an analog/digital technique. A factor or factors dominating the work performance of the tractor's lifting attachment, or of an equivalent working implement, is measured in the control system and, on the basis of such measurement or measurements, a signal representing the actual value in the control system and a signal representing the set point value are provided. A signal representing the difference between such values, that is, representing the control deviation, is also provided and is processed in an analog/digital control unit which governs the control means of the actuator such as, for example, a solenoid valve.

The most common work assignments of a tractor provided with an integral lifting attachment are various towing jobs, such as plowing, harrowing, trailer pulling, pulling a sowing fertilizer and equivalent. The other most common jobs in which the tractor is the pulling or pushing prime mover include municipal technology works and bog milling. Work projects of this type usually have some dominant factor such as, for example, the plowing depth in plowing, a certain suspension force, that is, a given pressure in the work cylinder of the lifting attachment when pulling a sowing fertilizer, the brushing depth or the brushing pressure against the surface in street repair work, the milling depth in bog milling, etc. It would be to advantage in practical work if the dominant factor could be adjusted and, when needed, kept substantially constant during the undertaking of the work.

As to the state of art associated with the invention, reference is made by way of example to French Pat. Nos. 1,374,855, 2,088,533, 2,093,952, 2,171,967 and to U.S. Pat. Nos. 3,505,577 and 3,732,955. Furthermore, reference is made to Finnish Pat. Nos. 48 959 and 54 981 of the present applicant. Finnish Pat. No. 54 981 is equivalent to British Pat. No. 1,503,592. Finnish Pat. No. 54 981 discloses a tractor control system, more particularly an electronic control system, comprising means for measuring a factor dominating the work performance of the tractor and dependent on the state and position of the hydraulic actuating attachments fixedly mounted on the tractor or detachable therefrom, such as plowing depth and/or position of the lifting arms and/or the position of the working implement and/or the pressure in a work cylinder. The electronic control system further comprises means for measuring quantities indicating the operational state of the tractor, such as the overload on its engine and/or the slip of its wheels. A quantity derived from the factor dominating the system is used to govern the hydraulic control member of the working implement actuator.

It is considered novel in Finnish Pat. No. 54 981 that influence is exerted on the control member by a non-linear unit known in itself in the art. The non-linear unit has a so-called dead range outside which a correction is effected in the correct direction to the dominating factor by mediation of the working implement actuator. The correction is effected by the control system. The quantities indicating the operational state of the tractor act in the control system in the manner of a follower control on a variable controlling the dominant factor, most advantageously over a non-linear unit. Thus, the slip of the tractor wheels and/or the overloading of its engine is reduced by a change of the dominant factor up to a given limit only.

The control system disclosed in Finnish Pat. No. 54 981 has, however, the drawback that signals from various pick-ups which are unessential, or outright erroneous, have an effect on the control system. There are several sources of interference such as, for example, strong vibration of the tractor and work implement or movements of the pick-up by sudden abrupt impact of the tractor against an obstacle. An effort could be made to avoid the effect of such erroneous signals by utilizing low pass filters or equivalent analog arrangements, but they introduce detrimental delays in the control circuit such as, for example, delays due to the time constants of RC circuits.

SUMMARY OF THE INVENTION

The principal object of the invention is to provide a control system for tractors which is free from the disadvantages of the known control systems.

An object of the invention is to provide a control system for tractors in which rapid peaks which are unessential to the work performed are completely disregarded.

Another object of the invention is to provide a control system for tractors in which strain on the actuator due to rapid oscillation of the actual value across the margin of the first dead range dimension is greatly eased.

Still another object of the invention is to provide a tractor control system which measures and processes the factors dominating the performance of a tractor working implement and provides an appropriate control for the existing situation.

Yet another object of the invention is to provide a tractor control system which optimizes work performance and reduces wear and tear on mechanical system components.

In order to achieve these objects and those which will become apparent hereinafter, the tractor control system of the invention comprises transforming a signal in analog form representing the control deviation into digital form by a sampling device, sampling at a sampling frequency $f_o$, or by another equivalent procedure, for obtaining a so-called dead range in a time dimension. The digital signal is processed in comparator members in which the limit values defining the dead range of the control circuit are set. When the amplitude of the pulses produced by the sampling, or equivalent, falls outside the dead range once or several times, the sampling device is provided with a transition to continuous following of the control deviation. The requisite control action is performed on this basis, so that when a value derived from the control deviation falls within the dead range, a transition is once again made to the sampling.

The first (I) dead range dimension applied in the invention is described in Finnish Pat. No. 54 981. The second (II) dead range is so placed in time that rapid "peaks" occurring during the time under control and having a duration of about 50–100 ms, for example, and which are unessential to the work performed are completely disregarded, even if a transgression I with regard to the dead range should occur. As mentioned, unessential peaks may in practice be introduced from the ambience, due to interference or movement of the pick-up when striking an obstacle, for example. Furthermore, if the actual value oscillates rapidly and repeatedly across the margin of the I dead range, the actuator is subjected to great strain. Thus, the procedure of the control system of the invention has a considerable calming effect on the control operation. The II dead range may be realized by the sampling principle, for example, while other electronic embodiments, such as digital filters, may equally be contemplated.

The tractor control system of the invention measures and processes the factors dominating the performance of a working implement attached to the three-point attachment of the lifting means of a tractor, for example, and, on the basis of the result, provides an appropriate control for the existing situation. The control performed by the system of the invention optimizes the work performance in several respects and also reduces wear and tear on the components of certain mechanical systems to a greater extent than in the known art.

In an advantageous embodiment of the control system of the invention, the logical operations required therein are carried out digitally. The digital operations unit is disposed between the analog unit and the output stage controlling the actuator. This provides an A/D embodiment which permits clear and positive appending of various boundary conditions, defined by logical statements, to the control operation. The digital embodiment provides a high interference threshold which, in practice, amounts to several volts. The digital unit proper may be a combined logic or programmable logic circuit, or a microprocessor. The data supplied to the digital block may come from switches, setting potentiometers, limit switches or other external apparatus, either mechanical or electronic, for example.

An advantageous governing apparatus of the control system of the invention does not interfere with the actual lifting events managed over a manual directional valve. Instead, it loads a hydraulic cylinder with pressurized fluid, or unloads it, at low flow levels in connection with the control operation of a so-called mini-valve. A mini-valve is understood to be an electrohydraulic valve, installed in parallel with a control valve proper, intended to control fluid flows amounting to about 25–30% of the main flow and loaded with electric step functions.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
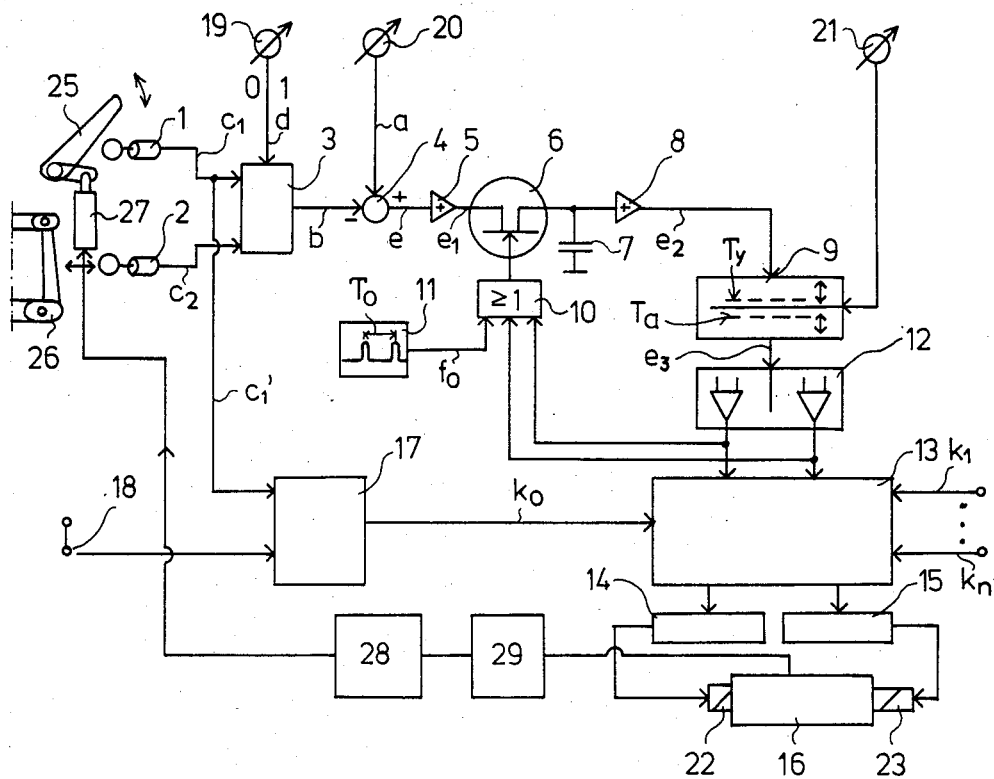
FIG. 1 is a block diagram of an embodiment of the tractor control system of the invention.

Position and traction resistance pick-ups 1 and 2 of FIG. 1 supply electric quantities $c_1$ and $c_2$, respectively, proportional to the quantity in question. The pick-ups 1 and 2 consist of magnetic pick-ups measuring an air gap, for example, so that they operate without parts subject to wear. The lifting means 25 of FIG. 1 primarily illustrates the lifting arms which are connected, on one hand, to a lifting cylinder known in itself in the prior art and, on the other hand, to the pull rods of the three-point lifting means of a tractor (not shown in the FIGS.). Traction resistance sensing using the pick-up 2 is effected via a mechanical linkage 26.

The electrical position and traction resistance data $c_1$ and $c_2$ and, also, mixing ratio data d from a control potentiometer 19 are supplied to a mixer or ratio unit 3 which determines which one is emphasized as the position criterion in the control, traction resistance, or position.

The numerals 0 and 1 at the control potentiometer 19 in FIG. 1 indicate that when the signal d represents the value 0, the ratio unit 3 supplies as a control signal b the signal $c_1$ supplied by the pick-up 1 and the signal $c_2$ has no effect whatsoever. The value 1 indicates the opposite condition wherein the signal $c_2$ is supplied as the control signal b and the signal $c_1$ is completely devoid of effect. The value $d=0.5$ represents the situation in which the control signal d is influenced with equal weight by both signals $c_1$ and $c_2$. In practice, the selected procedure is to provide the unweighted mean of the signals $c_1$ and $c_2$ via the ratio member 3.

A differential unit 4 is known in itself in the art and functions to supply a difference e (the control deviation) between a set point value a which is supplied by a setting unit 20 and the actual value b, as realized, to the electronic control system in the form of an electrical quantity. The difference or error value e is amplified by an amplifier 5 to a level appropriate for subsequent circuit elements.

The operation circuit of the invention, realizing the two-dimensional dead range includes components 6, 7, 8, 9, 10, 11 and 12. The switch 6 is used to derive samples from the error value $e_1$ often enough, storing them in a memory 7 carried out by analog technology. The stored error value is processed regarding amplitude in a pair of comparators 9 and 12. The sampling frequency of the switch 6 is about $f_o=1/T_o=20$ Hz, for example.

The aforedescribed sampling phase may be replaced with another equivalent procedure such as, for example, digital filters.

The comparator unit 9 determines the limits of sensitivity $T_y$ and $T_a$ of control, which are set symmetrically by a setting unit 21. The comparator unit 12 examines whether transgression of the upper limit $T_y$ or of the lower limit $T_a$ occurs. If there is a departure from within the dead range $T_y$-$T_a$ between such sensitivity limits, an operation command is given to the digital logic circuit 13, which then provides appropriate corrective action. As soon as transgression of the upper limit $T_y$ or of the lower limit $T_a$ in the respective direction, requiring correction, has been noted, the switch 6 is opened over a digital summing unit 10. This results in continuous monitoring of the manner in which the situation develops, as well as action within a closed control loop. Due to operation in this manner outside the dead range $T_y$-$T_a$, when the control is activated, control will proceed like a standard P control, for example, when the switch 6 is continuously closed and a pulse or control circuit 11 of the sampling unit exerts no influence. This mode of operation is maintained until the control deviation $e_1$ enters an area which is within the dead range $T_y$-$T_a$. The switch 6 is then momentarily closed and is controlled by the control circuit 11 of the sampling unit, and with the sampling taking place as hereinbefore described at the frequency $f_o$. The pulse unit 11 produces narrow pulses having a time interval $T_o$ defining the span of the other dead range, that is, the upper limit frequency $f_o/2$ of the delay-free and digital "low pass filter" defined by the units 6, 10 and 11.

As stated, as soon as one sample pulse of the quantity $e_1$ represents a value that belongs outside the dead range $T_y$-$T_a$, transition of the system to continuous "monitoring" and control takes place. However, the control system of the invention may be operated with a view to even further elimination of interference. This is accomplished by providing a logic circuit such that the value of the control deviation has to fall outside the dead range two or several consecutive times before the control system is activated to perform continuous monitoring and control. In this connection, the sampling frequency $f_o$ may obviously be accordingly increased.

The digital logic circuit 13 is a decision-making unit having the task of examining whether or not a given corrective measure of control technology is feasible. A number N of conditions are supplied to the logic circuit 13 in the form of input data. The number N of conditions may comprise, for example, switch data $k_1 \ldots k_n$. The digital logic circuit 13 may also bypass the control loop when certain conditions are met, whereby the lifting means 25 is controlled directly via an actuating unit or mini-valve 16. Some of these bypassing situations are described as follows.

The automatics have to be instructed as to which is the current operational state of the system. This data is supplied by the main control switch of the automatics. In other words, the automatics are either ON or OFF. As a further condition, the control system may receive from an external device a command to cover the automatics at given moments when the situation so requires. One condition is the switch data supplied by the transporting situation. This will, of course, cover the control automatics.

A processing unit 17 controls leakage compensation for a lifting cylinder 27 of the lifting means 25. Switch data 18 and position data $c_1$ are processed in the processing unit 17. When in the transport position, that is, when the lifting arms are raised, a change of position $c_1$, caused by leakage of the lifting cylinder 27, for example, is observed, a compensating lift correction is applied to the signal $k_o$ via the processing unit 17 and the digital logic circuit 13.

The control system of FIG. 1 has an output stage 14, 15 which comprises matching elements between the digital logic circuit 13 and the actuating unit 16. The actuating unit 16 comprises control solenoids 22 and 23. Lifting occurs when the digital logic circuit 13 supplies the lifting command to the output stage 14, which in turn generates the electric current required for the solenoid 22 of the lifting side of the magnetic valve. This conveys the stem of the valve 16 into a position in which the free flow path is closed and fluid can enter the lifting cylinder 27.

The mini-valve 16 controls a hydraulic control valve 29 in the system of FIG. 1. The hydraulic system includes a pump and other apparatus by which pressure is supplied to the lifting cylinder 27. The lifting cylinder 27 is preferably a single action cylinder and rotates in a manner known in itself, the lifting means or arms 25, to which pull arms of the three-point lifting attachment (not shown in the FIGS.) are connected.

In the foregoing description, one of the possible sampling frequencies is indicated as $f_o$ of about 10 to 20 Hz. In practice, this sampling frequency may vary within comparatively wide limits, for example, defined by the type of work and the speed. If the system is so arranged that the transition from sampling to continuous control and following is not made until the amplitude of more than one sampling pulse has gone outside the dead range $T_y$-$T_a$, the sampling frequency must obviously be increased in the same proportion. In practice, the sampling frequency may as a rule be maintained in the range from 1 to 100 Hz.

Figure 2:
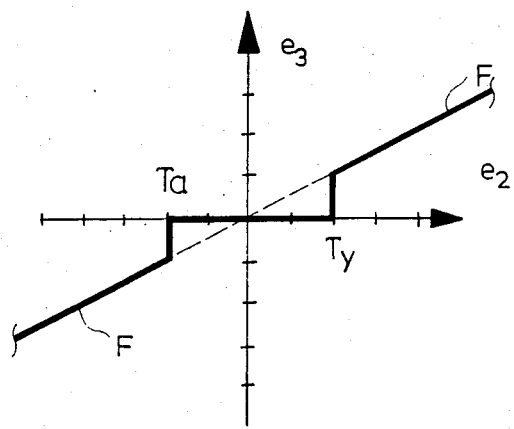
FIG. 2 is a graphical presentation of the characteristic curve of the non-linear element of the control system of the invention, which has a dead range.

FIG. 2 illustrates a characteristic curve F of the non-linear element. As shown in FIG. 2, the output signal of the non-linear element $e_3=0$ when the input signal $e_2$ is in the dead range $T_y$-$T_a$. After the input signal $e_2$ has passed by the dead range, the output signal $e_3$ is provided. The amplitude of the output signal $e_3$ is directly proportional to the amplitude of the input signal $e_2$, for example.

The dynamics of the lifting activity need not be considered in this connection. They are determined by the hydraulic circuit, the design of the mini-valve and the pump in the hydraulic circuit. The starting point for the setting of the dynamics is that the closed control loop has to carry out the correction movement of about 1 to 3 cm during a period which is hundreds of milliseconds, and this is usually a short enough delay with regard to the system.

In a case of working depth, such as, for example, plowing depth, being the dominant factor, the lowering correction is provided by the aid of the lowering command supplied by the digital logic circuit 13 through the output stage 15 and the solenoid 23. The lifting cylinder 27 is single-acting; that is, the plow itself lowers as soon as the lowering control frees the path of the pressurized fluid to the fluid sump.

In the invention, it is essential, in addition to the two-dimensional dead range hereinbefore described, that the set point value and actual value signals, and the error signals derived therefrom be in analog form to begin with and that transition is later made to using digital signals derived from such analog signals. This results in the control system's sensitivity to interference being reduced and versatile processing of the signals, as well as perfect functioning of the system in all respects.

Although in the various units of the control system are presented in schematic form only, anyone ordinarily skilled in analog/digital electronics and familiar with hydraulic control systems may readily carry out the invention without any inventive work and may modify various details thereof in a multitude of ways.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A tractor control system for a work implement, said control system having an electronic circuit utilizing an analog/digital technique and including an analog/digital control unit and means for measuring a factor dominating the performance of an actuator and providing a first signal representing the actual value of said control system, a second signal representing a set point value, and a third signal in analog form representing the difference between the values of said first and second signals, said difference constituting the control deviation for governing said analog/digital control unit, said unit for controlling said actuator, said control system comprising converting means for converting said third signal to digital form by sampling means for sampling at a sampling frequency $f_o$ to establish a dead range in a time dimension, said sampling means providing pulses, signals supplied to said converting means being first in analog form and being converted to digital signals in establishing a first dead range in a time dimension whereby said control system transfers and processes digital information; and comparator means for processing said digital signal, said comparator means including an output, limit value comparators having limit values defining said dead range set therein, whereby when the amplitude of the pulses established by said sampling falls outside said dead range at least one time, said sampling means provides a transition to continuous following of the control deviation, thereby performing a requisite control so that when the value of a fourth signal derived from said control deviation falls into said dead range said sampling is repeated, a digital logic circuit connected to the output of said comparator means, means for supplying switch data to said digital logic circuit thereby enabling said digital logic circuit to determine whether a control measure suggested by said control system may be carried out, said comparator means comprising a sensitivity setting comparator and a setting unit connected to said sensitivity setting comparator for setting the limits of said dead range.

2. A control system as claimed in claim 1, for controlling the plowing depth and traction resistance of said work implement, said control system comprising lifting means for lifting said work implement, wherein said means for measuring comprises pick-ups for sensing the position of said lifting means for controlling the plowing depth and for sensing traction resistance acting on a tractor from said work implement, a ratio unit, said pick-ups producing signals and said signals being supplied to said ratio unit, and control means supplying another signal for setting the relative weight coefficients of the signals produced by said pick-ups, said ratio member producing said first signal which represents both the plowing depth and the traction resistance with appropriate relative weight factors and functions as said actual value signal of said control system.

3. A control system as claimed in claim 2, wherein said lifting means comprises lifting arms and a lifting cylinder coupled to said lifting arms, and said control system further comprising a processing unit for controlling compensation for leakage of said lifting cylinder in transport position when said lifting arms are raised, said processing unit having an output and observing changes occurring in said lifting cylinder and a digital logic circuit coupled to the output of said processing unit for providing compensating lifting correction.

4. A control system as claimed in claim 1, comprising an actuator with a dominating factor measured by said measuring means, wherein said actuator comprises a magnetic valve having control solenoids.

5. A control system as claimed in claim 4, wherein said magnetic valve consists of a mini-valve.

6. A control system as claimed in claim 1, wherein said sampling frequency $f_o$ is approximately 1 to 100 Hz.

7. A control system as claimed in claim 6, wherein said sampling frequency is approximately 10 to 20 Hz.

8. A control system as claimed in claim 1, further comprising a memory for storing pulses of said sampling means and wherein said fourth signal is stored therein and processed in said comparators.

9. A control system as claimed in claim 1, further comprising external means connected to said digital logic circuit for providing a command to cover automatics at appropriate times.

* * * * *